United States Patent
Xi et al.

(10) Patent No.: US 7,406,859 B2
(45) Date of Patent: Aug. 5, 2008

(54) ADAPTABLE END EFFECTOR FOR ATOMIC FORCE MICROSCOPY BASED NANO ROBOTIC MANIPULATORS

(75) Inventors: Ning Xi, Okemos, MI (US); Guangyong Li, East Lansing, MI (US); Jiangbo Zhang, Lansing, MI (US)

(73) Assignee: Board of Trustees operating Michigan State University, East Lansing, MI (US)

( * ) Notice: Subject to any disclaimer, the term of this patent is extended or adjusted under 35 U.S.C. 154(b) by 246 days.

(21) Appl. No.: 11/399,690

(22) Filed: Apr. 6, 2006

(65) Prior Publication Data

US 2006/0225490 A1 Oct. 12, 2006

Related U.S. Application Data

(60) Provisional application No. 60/668,843, filed on Apr. 6, 2005.

(51) Int. Cl.
*G01B 5/28* (2006.01)
(52) U.S. Cl. ....................................... 73/105
(58) Field of Classification Search ............ None
See application file for complete search history.

(56) References Cited

U.S. PATENT DOCUMENTS 6,862,924 B2 * 3/2005 Xi et al. ........................ 73/105
2006/0014202 A1 * 1/2006 Watanabe et al. ............. 435/6

OTHER PUBLICATIONS

Hu et al, ?Method for separating single biological macromolecule Abstract, Sep. 29, 2004.*

* cited by examiner

*Primary Examiner*—Robert R Raevis
(74) *Attorney, Agent, or Firm*—Harness, Dickey & Pierce, P.L.C.

(57) ABSTRACT

An improved nanomanipulation system is provided for performing nanomanipulation operations in relation to a sample surface. The system includes: an atomic force microscope having a probe for performing nanomanipulation operations on the sample surface, where the probe includes a cantilever having a layer of piezoelectric material; a position detector configured to ascertain deformation of the cantilever during a nanomanipulation operation; and an adaptable end effector controller adapted to receive data indicative of the deformation from the position detector and implements a control scheme based on the deformation data. The control scheme produces a control signal that is applied to the piezoelectric material of the cantilever, thereby maintaining the straight shape of the cantilever during the nanomanipulation operation.

27 Claims, 13 Drawing Sheets

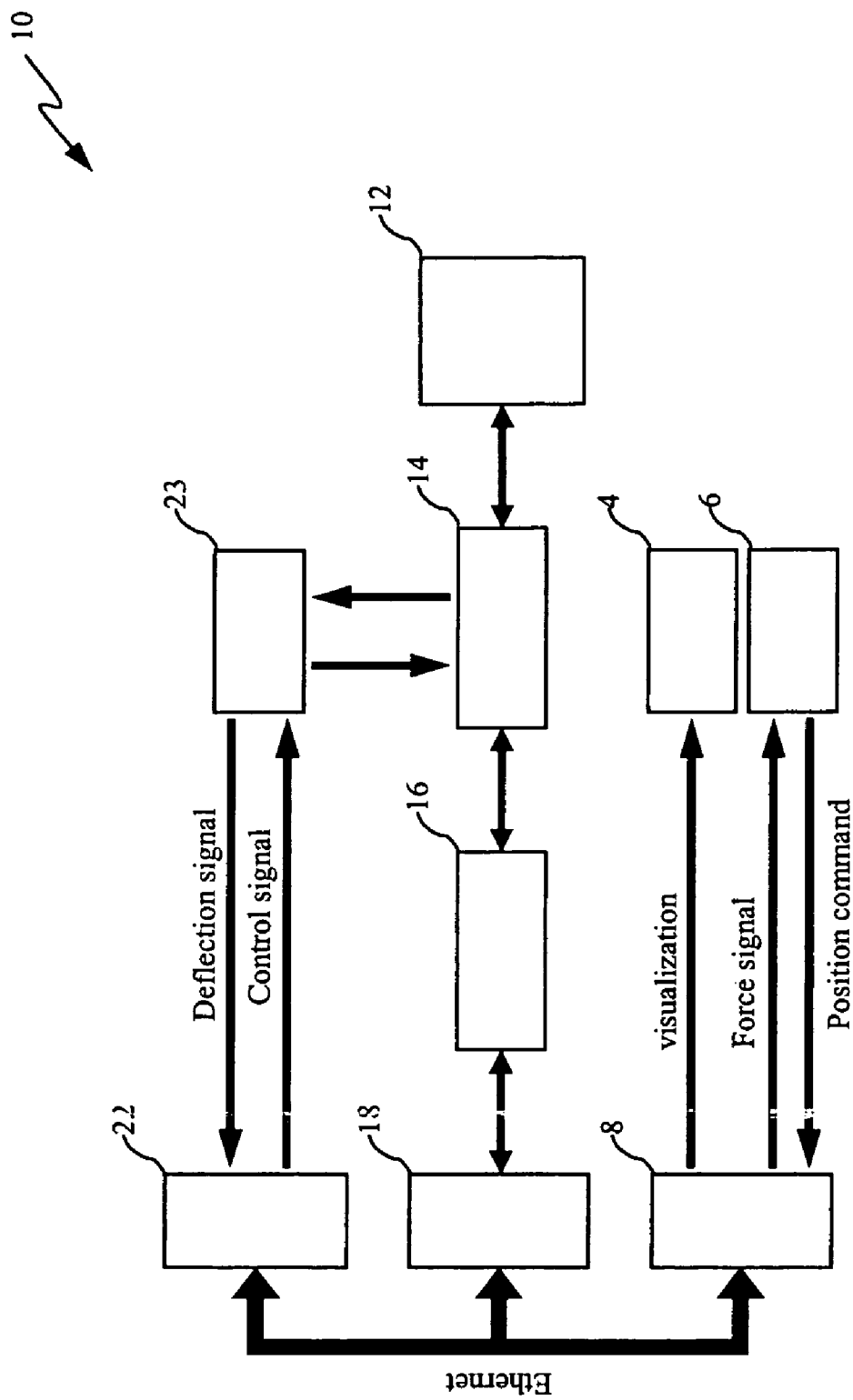

Cross Section B - B

Cross Section A - A

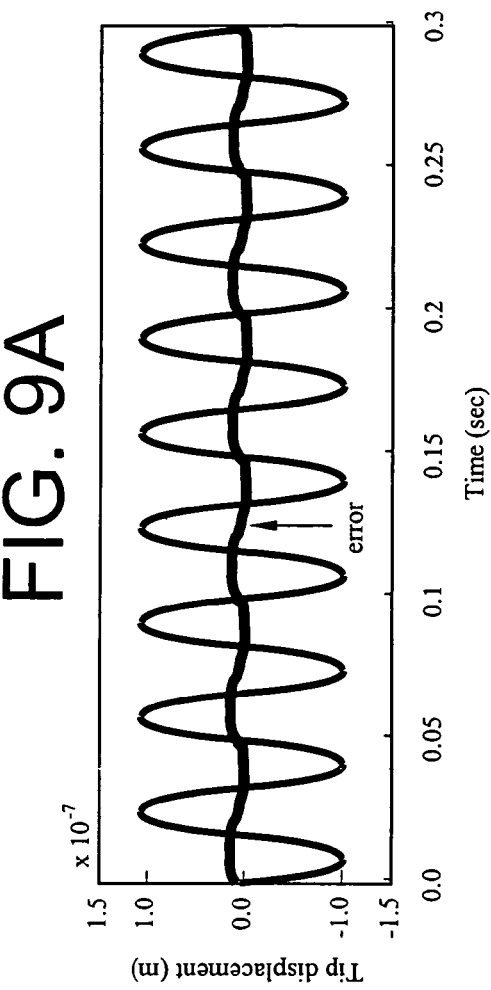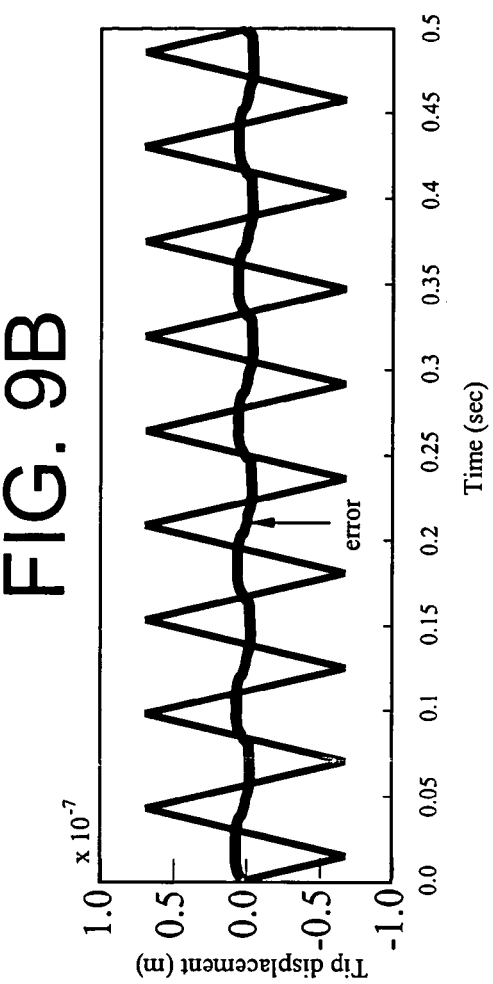

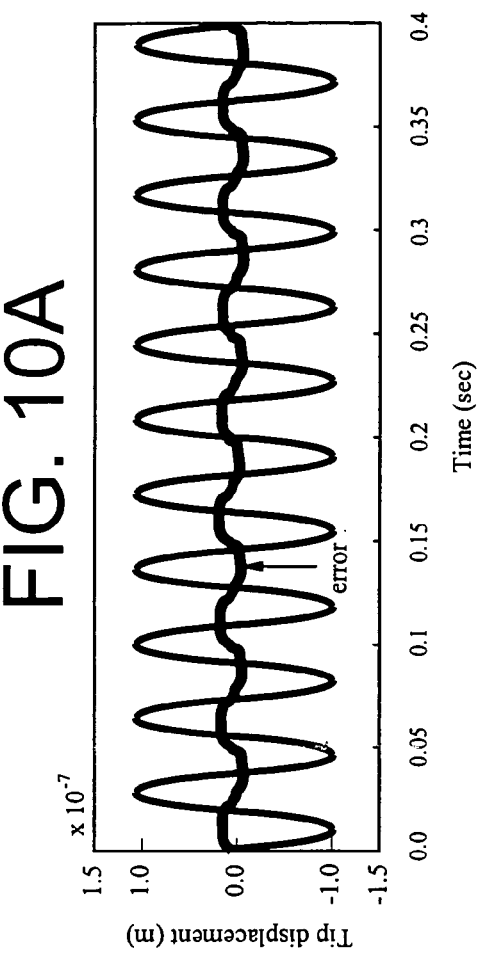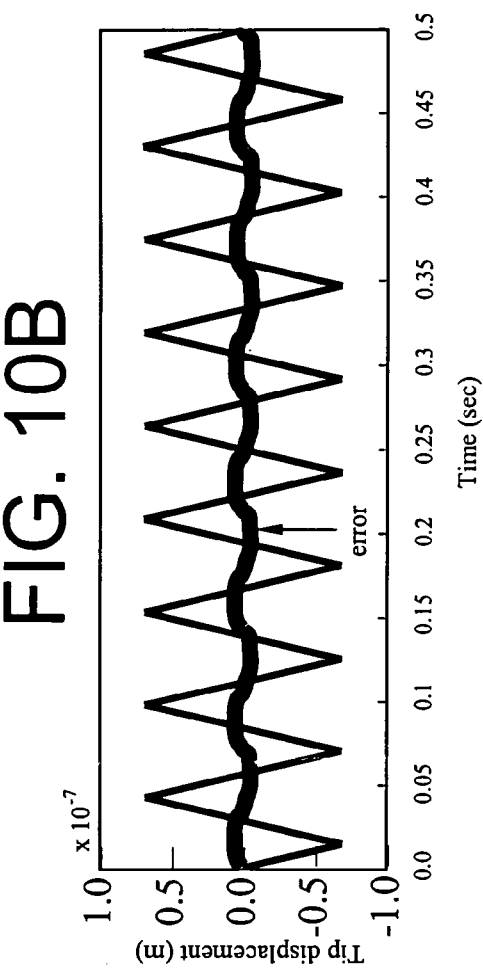

ADAPTABLE END EFFECTOR FOR ATOMIC FORCE MICROSCOPY BASED NANO ROBOTIC MANIPULATORS

CROSS-REFERENCE TO RELATED APPLICATIONS

This application claims the benefit of U.S. Provisional Application No. 60/668,843, filed on Apr. 6, 2005. The disclosure of the above application is incorporated herein by reference.

FIELD OF THE INVENTION

The present invention relates generally to nanomanipulation using atomic force microscopy and, more particularly, an adaptable end effector for an atomic force microscope.

BACKGROUND OF THE INVENTION

Since the invention of the atomic force microscope (AFM), it has been proven to be a very powerful tool for characterizing surface features from the micrometer scale to the atomic scale. Beside its capability as a measurement instrument, the AFM has also been exploited in recent years to modify the sample surface through nanomanipulation by many research groups. Some of them are trying to utilize the haptic devices to facilitate the nanomanipulation. Unfortunately, the implementation of the haptic nanomanipulation is hindered by the difficulty to obtain reliable force information because of the softness of the conventional cantilever.

Because the conventional cantilever is very soft, a preload normal force has to be applied on the tip in general case in order to keep the tip contacting the surface and overcome the tip slipping over the nano-object. The preload normal force is usually much stronger than the tip-object interaction forces, which make the haptic feeling dominated by the preload force. Therefore, it becomes difficult to feel the actual tip-object interaction force during manipulation. It also becomes very difficult to precisely control the tip position in the lateral direction during manipulation because the preload force causes the cantilever not only to bend in the normal direction but also cause the tip to move in the lateral direction. Consequently, the nano-object may easily be lost during nanomanipulation. Furthermore, the preload force will wear out the tip and cause contamination easily. Therefore, a rigid cantilever is preferred for AFM based nanomanipulation. However, since the interaction force is measured from the deflection of the cantilever and a rigid cantilever won't be deflected by the interaction force, the interaction force is undetectable with a rigid cantilever. Hence, it is a dilemma whether to use a soft cantilever or a rigid one for nanomanipulation. Thus, any technique that possesses the advantages of soft cantilever and rigid cantilever simultaneously will help to perform AFM based nanomanipulation without the preload force on the cantilever-tip.

Therefore, it is desirable to provide an active probe for use as an end effector for an AFM-based nanomanipulation system. During imaging mode, the active probe is controlled to bend in the same direction as the interaction force between the tip and samples and thus make the tip response faster, increase the imaging speed, and improve the image quality. During manipulation mode, the active probe is controlled to be rigid and maintain its straight shape, and thus the deformation of the cantilever is eliminated during manipulation. At the same time, the control signal is used to represent the interaction force. Hence, the active probe can be used to improve the accuracy of nanomanipulation and the force sensitivity of the haptic nanomanipulation system simultaneously. Since the cantilever keeps straight during manipulation and is adaptable to different sized objects, it is called adaptable end effector. A control algorithm, to keep the cantilever straight during nanomanipulation, is also proposed based on the developed model of the flexible cantilever. A preload force of the cantilever is no longer needed and the position control is significantly improved since the cantilever can maintain its straight shape during nanomanipulation.

SUMMARY OF THE INVENTION

An improved nanomanipulation system is provided for performing nanomanipulation operations in relation to a sample surface. The system includes: an atomic force microscope having a probe for performing nanomanipulation operations on the sample surface, where the probe includes a cantilever having a layer of piezoelectric material; a position detector configured to ascertain deformation of the cantilever during a nanomanipulation operation; and an active probe controller adapted to receive data indicative of the deformation from the position detector and implements a control scheme based on the deformation data. The control scheme produces a control signal that is applied to the piezoelectric material of the cantilever, thereby maintaining the rigidity of the cantilever during the nanomanipulation operation.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

FIG. 1 is a block diagram depicting a nanomanipulation system according to the present invention;

FIGS. 9A and 9B are graphs illustrating tip displacement an active probe having an LQR controller in accordance with the present invention;

FIGS. 10A and 10B are graphs illustrating tip displacement an active probe having a PD controller in accordance with the present invention;

DETAILED DESCRIPTION OF THE PREFERRED EMBODIMENTS

Figure 2A:
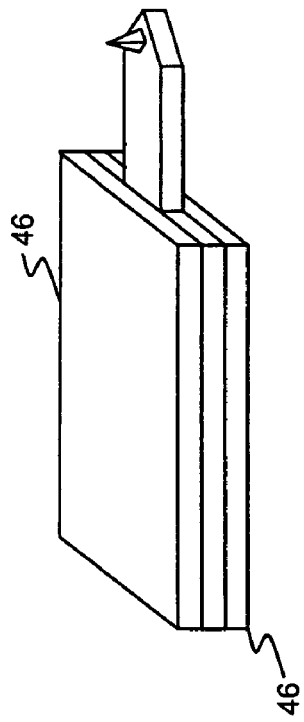
FIGS. 2A-2D illustrate exemplary active probes for use as end effectors in the nanomanipulation system of the present invention.

FIG. 1 depicts an AFM-based nanomanipulation system 10 according to the principles of the present invention. The nanomanipulation system 10 is generally comprised of three subsystems: an atomic force microscope, an augmented reality environment and a real-time active probe controller. Each subsystem is described below. While the following description is provided with reference to a particular system configuration, it is readily understood that other system configurations are also within the scope of the present invention.

First, the atomic force microscope subsystem includes an AFM head 12, a signal access module 14 (SAM), an AFM controller 16 and a main computer 18 as is readily known in the art. An exemplary atomic force microscope system is the NanoScope IV Atomic Force Microscope commercially available from Digital Instruments Inc. in Santa Barbara, Calif. Although an atomic force microscope is presently preferred, this is not intended as a limitation on the broader aspects of the present invention. On the contrary, other types of scanned-proximity probe microscopes (e.g., scanning tunneling microscopes) are also within the scope of the present invention.

The augmented reality environment includes a visual display 4, a haptic device 6 and a nanomanipulation control program running a secondary computing device 8. During nanomanipulations, operators use the haptic device 6 to input tip position commands and feel the real-time interaction force between the tip and an object being manipulated. The augmented reality environment in turn sends the position commands to the atomic force microscope. In real-time, the visual display 4 may provide a locally updated AFM image of the work surface. Further details regarding an exemplary nanomanipulation system having an augmented reality environment are found in U.S. patent application Ser. No. 10/428,578 filed on May 2, 2003 and which is incorporated herein by reference.

In order to improve the force feeling and the tip position control, an active probe is used as the end effector. During nanomanipulations, an active probe controller 22 implements a control algorithm which controls the rigidity of the active probe as will be further described below. In an exemplary embodiment, a probe controller may be implemented as a control program running in a Linux operating environment in conjunction with a data acquisition card 23 (e.g., NI PCI-6036E card from National Instruments) for interfacing with the SAM of the AFM subsystem.

FIG. 2A illustrates an exemplary active probe 40 in accordance with the present invention. The active probe 40 is comprised generally of a cantilever structure 42 and a tip 44. The cantilever structure 42 is further defined as a substantially rectangular plate having a protruding finger 45 extending outwardly in a longitudinal direction of the plate. The pyramid shaped tip 44 extends outwardly from a distal end of the protruding finger 45 in a direction substantially perpendicular to the longitudinal surface of the plate. The cantilever structure may be micro-machined from bulk silicon. The active probe further includes a layer of piezoelectric material 46 applied on at least one side of the rectangular plate.

Figure 2B:
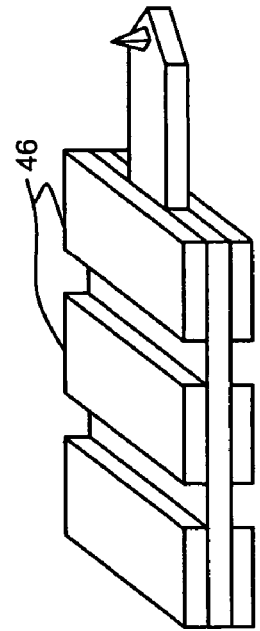
Figure 2C:
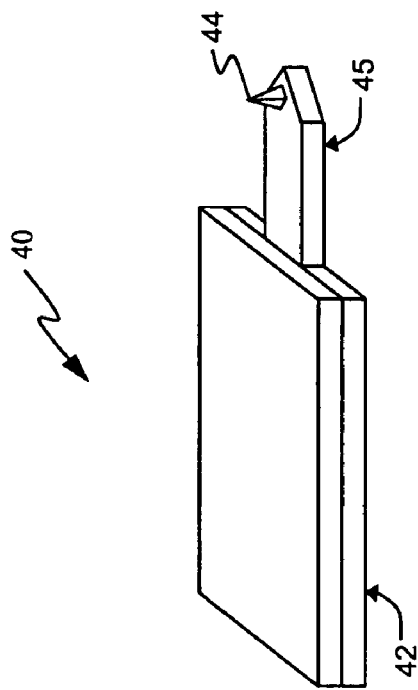
Figure 2D:
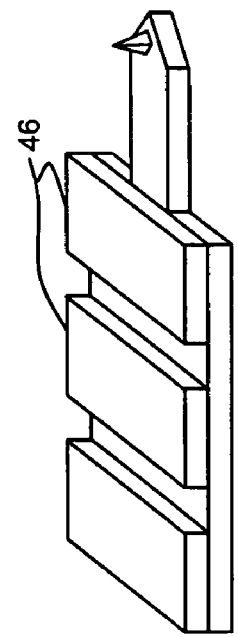

The piezoelectric film may be applied in different ways as shown in FIGS. 2A-2D. In FIG. 2A, the piezoelectric film 46 is only coated on a topside of the cantilever 42. In this case, the cantilever is thin and flexible, but the actuation force generated by the piezoelectric film is relatively weak. The piezoelectric film 46 can also be coated on both sides of the cantilever 42 as shown in FIG. 2B. If two piezoelectric films are used as activator, the actuation force becomes more powerful. The double side coated adaptable end effector has another advantage of combining activating and sensing together. One of the piezoelectric films can be used as activator; whereas, the other film can be used as a sensor to detect the deflection of the cantilever. However, the double coating makes the cantilever thicker than the single side coated cantilever. In FIGS. 2C and 2D, the piezoelectric film 46 is cut into several segments. Because the cantilever is a flexible structure, which is a spatially distributed system, multiple segments of piezoelectric film can help improve the control effects.

Figure 3A:
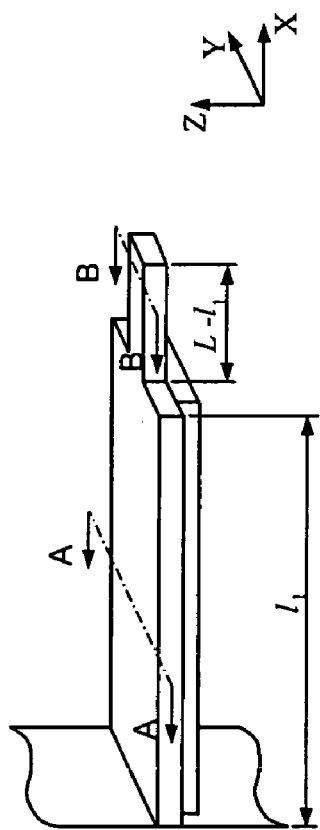
FIGS. 3A-3C further illustrate one exemplary embodiment of an active probe in accordance with the present invention.
Figure 3C:
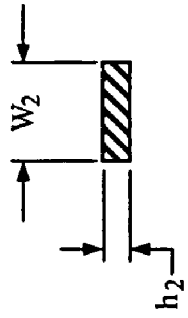
Figure 3B:
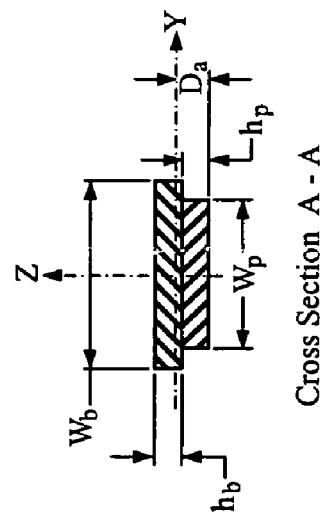

In order to actively control the active probe, a detailed model of the probe is presented with reference to FIGS. 3A-3B. Since the width of the cantilever is much more significant than the thickness, the strain along the width of the cantilever can be assumed to be zero. Thus, only transverse vibrations of the beam will be analyzed. The cantilever will be analyzed as two parts, part I ($0 \leq x \leq l_1$) and part II ($l_1 \leq x \leq L$). For all variables in this paper, a superscript I indicates the part I, while a superscript II indicates the part II. Similarly, subscript b and p refers to the silicon beam layer and the piezoceramic layer, respectively. For example, $E_b$ is the Yang's modulus of the silicon layer, and $E_p$ is the Yang's modulus of the piezoceramic layer.

When an active voltage V(x,t) is applied to the piezoceramic film, the strain $\epsilon_a$ included in the piezoceramic film is given by:

$$\epsilon_a(x, t) = V(x, t) \times \frac{d_{31}}{h_p} \tag{1}$$

where $\epsilon_a$ is the induced strain in the piezoceramic film, V is the applied voltage, $d_{31}$ is the appropriate static piezoelectric constant, and $h_p$ is the thickness of the piezoceramic layer. Because the piezoceramic has uniform geometry along its length, V(x,t) is replaced by V(t) in the following analysis.

The location of the neutral axis at the cross section A-A, as shown in FIG. 3B, is given by:

$$D_a = \frac{E_p h_p^2 W_p + E_b h_b^2 W_b + 2E_b W_b h_b h_p}{2(E_b W_b h_b + E_p W_p h_p)} \tag{2}$$

where E is the Yang's modulus, h is the thickness of the layers and W the width of the layers. On the piezoceramic area of the cross section A-A, as shown in FIG. 3B, the stress inside the piezo layer $\sigma_p$ is given by $$\sigma_p(x,t) = E_p \cdot [\epsilon(x,t)] - \epsilon_a(x,t)] \tag{3}$$

where $\epsilon$ is the strain caused by the deflection of the beam. In the silicon layer of A-A, as shown in FIG. 3B, the stress $\sigma_b$ is given by:

$$\sigma_b(x,t) = E_b \cdot \epsilon(x,t) \tag{4}$$

On the cross section A-A in FIG. 3B, the moment of part I $M^I$ is given by:

$$M^I(x, t) = \int_A \sigma \cdot dA \cdot z = \int_{-D_a}^{-D_a+h_p} \sigma_p(x, t) W_p z \, dz + \int_{-D_a+h_p}^{-D_a+h_p+h_b} \sigma_b(x, t) W_b z \, dz$$

Substituting from (3) and (4) gives:

$$M^I(x, t) = (EI)^I \cdot \frac{\partial^2 w(x, t)}{\partial x^2} - C_a \cdot V(t) \quad (5)$$

where $(EI)^I$ is the effective bending stiffness at the section A-A for part I, w is the transverse deflection of the beam, and $C_a$ is a constant which depends on the geometry and materials of the beam expressing the bending moment per volt. $(EI)^I$ and $C_a$ are given by:

$$(EI)^I(x, t) = E_p W_p h_p \cdot \left( \frac{1}{3} h_p^2 + D_a^2 - h_p D_a \right) +$$
$$E_b W_b h_b \left[ \frac{1}{3} h_b^2 + h_p^2 + D_a^2 + h_b h_p - 2h_p D_a - h_b D_a \right]$$

$$C_a = E_p \cdot d_{31} \cdot W_p \cdot \frac{h_p - 2D_a}{2}$$

On cross section B-B, as shown in FIG. 3C, the moment of part II $M^{II}$ is given by:

$$M^{II}(x, t) = (EI)^{II} \cdot \frac{\partial^2 w(x, t)}{\partial x^2} \quad (6)$$

where $(EI)^{II}$ is the effective bending stiffness at the cross section B-B and given by:

$$(EI)^{II} = E_b W_2 h_2^3 / 12$$

Considering part I ($0 \leq x \leq l_1$) and part II ($l_1 \leq x \leq L$) of the cantilever respectively, and combining (5) and (6) with a conventional Bernoulli-Euler beam analysis yields the equations of motion for transverse vibrations w(x,t) of the cantilever. The governing equations are:

$$\frac{\partial^2}{\partial x^2} \left[ (EI)^I \frac{\partial^2 w(x, t)}{\partial x^2} - C_a V(t) \right] + \rho^I A^I \frac{\partial^2 w(x, t)}{\partial t^2} = 0 \quad (7)$$
for $0 \leq x \leq l_1$ $$(EI)^{II} \frac{\partial^4 w(x, t)}{\partial x^4} + \rho^{II} A^{II} \frac{\partial^2 w(x, t)}{\partial t^2} = 0 \quad (8)$$

for $l_1 \leq x \leq L$ with the boundary conditions $$\begin{cases} w(0, t) = 0, \quad w'(0, t) = 0, \\ (EI)^I w''(l_1, t) - C_a V(t) = (EI)^{II} w''(l_1, t), \\ (EI)^I w'''(l_1, t) = (EI)^{II} w'''(l_1, t), \\ (EI)^{II} w''(L, t) = 0, \quad (EI)^{II} w'''(L, t) = 0. \end{cases} \quad (9)$$

where
$\rho^I = (\rho_p W_p h_p + \rho_b W_b h_b)/(W_p h_p + W_b h_b)$,
$\rho^{II} = \rho_b$, $A^I = W_p h_p + W_b h_b$,
$A^{II} = W_2 h_b$, $w'(x,t) = \partial w(x,t)/\partial x$,
$w''(x,t) = \partial^2 w(x,t)/\partial x^2$,
$w'''(x,t) = \partial^3 w(x,t)/\partial x^3$,
$w''''(x,t) = \partial^4 w(x,t)/\partial x^4$.

and $\rho$ is the density of the layers; A is the cross-sectional area of the layers.

Since the applied voltage V(t) is spatially uniform along the length of the cantilever, the spatial derivatives of V, which is the input of the system described by (7), equal to zero. Thus, the system is simplified to a linear distributed parameter system that is actuated only at the interior boundary, $x = l_1$.

In the following, the Lagrange method is used to obtain a decoupled ordinary differential equation to describe the system.

The kinetic energy of the beam is given by:

$$T = \frac{1}{2} \int_0^{l_1} \rho^I A^I \dot{w}^2(x, t) dx + \frac{1}{2} \int_{l_1}^L \rho^{II} A^{II} \dot{w}^2(x, t) dx \quad (10)$$

where $\dot{w}$ is the derivative of w with respect to time t. The potential energy of the beam is given by:

$$V = \frac{1}{2} \int_0^{l_1} \frac{1}{(EI)^I} \left[ (EI)^I \frac{\partial^2 w(x, t)}{\partial x^2} + C_a V(t) \right]^2 dx + \quad (11)$$
$$\frac{1}{2} \int_{l_1}^L (EI)^{II} \left( \frac{\partial^2 w(x, t)}{\partial x^2} \right)^2 dx$$

Using the assumed mode-summation method, the solution of (7) and (8) can be expressed by:

$$\begin{cases} w(x, t) = \sum_{i=1}^{\infty} \phi_i^I(x) q_i(t) & \text{for } 0 \leq x \leq l_1 \\ w(x, t) = \sum_{i=1}^{\infty} \phi_i^{II}(x) q_i(t) & \text{for } l_1 \leq x \leq L \end{cases} \quad (12)$$

where $q_i(t)$ is the modal coordinate, and $\phi_i(x)$ is the mode shape which has the following form:

$$\phi_i^k(x) = A_i^k \sin \beta_i^k x + B_i^k \cos \beta_i^k x + C_i^k \sinh \beta_i^k x + D_i^k \cosh \beta_i^k x \text{ where } k = I, II$$

The coefficients $A_i, B_i, C_i, D_i$ are determined to satisfy the boundary conditions given by (9).

Substituting (12) into (10) and (11), and then by using the Lagrange equation and augmenting proportional damping (damping coefficients $\zeta_i$), governing equations can be expressed by decoupled ordinary differential equation for each mode of the cantilever as follows:

$$\ddot{q}_i + 2\zeta_i \omega_i \dot{q}_i + \omega_i^2 q_i = -\frac{C_a V(t)}{l_i} \int_0^{l_1} \frac{\partial^2 \Phi_i^I}{\partial x^2} dx \quad (13)$$

for $i = 1, 2, \ldots, \infty$ where $I_i$ is the generalized mass, defined as follows:

$$I_i = \int_0^{t_1} (\phi_i^I)^2 \rho^I A^I \, dx + \int_{t_1}^L (\phi_i^{II})^2 \rho^{II} A^{II} \, dx$$

Figure 4:
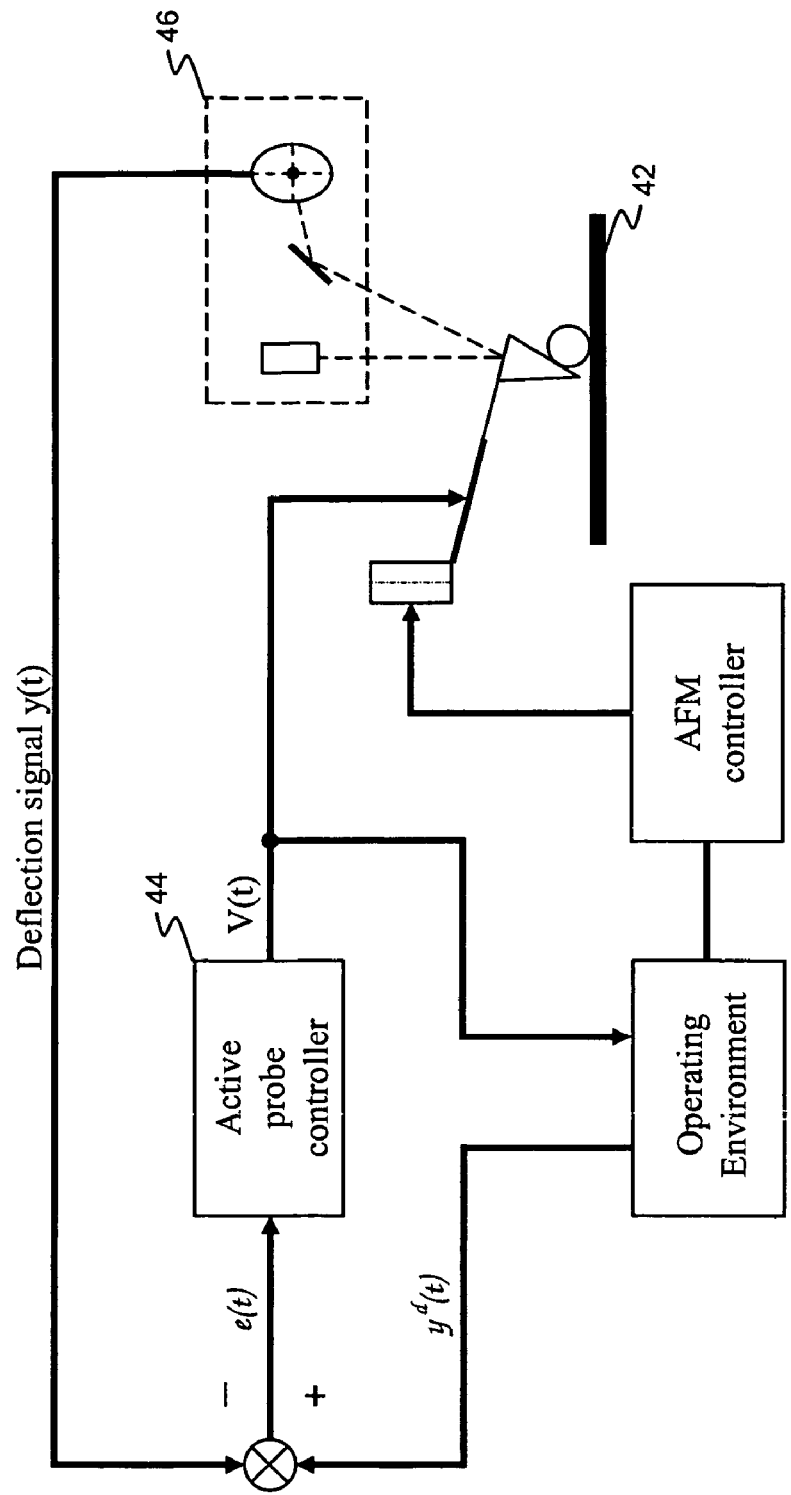
FIG. 4 is a block diagram which provides an overview of the control scheme for the active probe in accordance with the present invention.

FIG. 4 provides an overview of the control scheme for the active probe. For illustration purpose, an active probe 42, an active probe controller 44 and a position detector 46 for the active probe are shown as comprising the nanomanipulation system.

During manipulation mode, the active probe is controlled to keep the cantilever straight. Briefly, the position detector is configured to ascertain deformation of the cantilever during a nanomanipulation operation. The active probe controller receives the data indicative of the deformation from the position detector and implements a control scheme which maintains the rigidity (i.e., a straight shape) of the cantilever. More specifically, the control scheme produces a control signal that is applied to the piezoelectric material of the cantilever, such that the cantilever bends in an opposite direction to the interaction force caused by the manipulated object and thereby increase its nominal rigidity to keep the cantilever straight. Two control schemes for controlling the bending of the probe during the manipulation mode are further described below. However, it is readily understood that other control schemes may be employed and thus are within the broader aspects of the present invention.

The first control scheme is a PD controller. Using the mode analysis method, the frequencies of the first three modes of the active probe can be obtained as 49.2K, 216.3K and 374.4K Hz. For illustration purposes, only the first mode is taken into the controller. For two reasons: first, the frequencies of the second and higher modes are high enough to be ignored; and second, the experimental results also show that the contribution of the second and higher modes to the vibration of the cantilever is very small.

The goal of the controller is to eliminate the deformation caused by the interaction force between tip and manipulating object. In other words, it is desired to have w(L,t) which is the transverse deflection at the end of the cantilever equal to zero. By defining w(L,t) as the output y(t), the following equations can be derived from (12)

$$\begin{cases} y(t) = w(L,t) = \sum_{i=1}^{\infty} \phi_i^{II}(L) \cdot q_i(t) \\ \dot{y}(t) = \dot{w}(L,t) = \sum_{i=1}^{\infty} \phi_i^{II}(L) \cdot \dot{q}_i(t) \\ \ddot{y}(t) = \ddot{w}(L,t) = \sum_{i=1}^{\infty} \phi_i^{II}(L) \cdot \ddot{q}_i(t) \end{cases} \quad (14)$$

Upon retaining only the first mode and combining (13) and (14), a reduced dynamic model can be given as:

$$\ddot{y}(t) + 2\zeta_1 \omega_1 \dot{y}(t) + \omega_1^2 y(t) = c_1 V(t)$$

where $$c_1 = -\Phi_1^{II}(L) \frac{C_a}{I_1} \int_0^{t_1} \frac{\partial^2 \Phi_i^I(x)}{\partial x^2} \, dx$$

Then the open loop transfer function can be get as:

$$\frac{Y(S)}{V(S)} = \frac{c_1}{S^2 + 2\zeta_1 \omega_1 S + \omega_1^2}$$

The PD controller can be designed as:

$$V(t) = K_v(\dot{y}^d - \dot{y}) + K_p(y^d - y) \quad (15)$$

where $y^d$ is the desired trajectory and $\dot{y}^d$ is the desired velocity. $K_p$ and $K_v$ is the proportional gain and derivative gain respectively, Therefore, the closed-loop transfer function can be derived as:

$$\frac{Y(S)}{V(S)} = \frac{c_1(K_p + K_v S)}{S^2 + (2\zeta_1 \omega_1 + c_1 K_v)S + \omega_1^2 + c_1 K_p} \quad (16)$$

A second control scheme is a linear quadratic regulator control technique. An advantage of the LQR control method is the linearity of the control law, which leads to easy analysis and practical implementation. Another advantage is its good disturbance rejection and tracking performance and stability. This control algorithm is a state feedback controller and requires a complete knowledge of the whole state for each time instance. However, only the measurement of the tip displacement is available in this system and no states are measurable, a full order observer is then required to estimate all of the states.

The goal of the controller is to eliminate the deformation caused by the interaction force between tip and manipulating object. In other words, it is desired to have w(L,t) which is the transverse deflection at the end of the cantilever equal to zero. By defining w(L,t) as the output y(t), the following equation can be derived from (12)

$$y(t) = w(L,t) = \sum_{i=1}^{\infty} \phi_i^{II}(L) \cdot q_i(t) \quad (17)$$

For the system under consideration, a state space model can be obtained using the finite dimensional approximation of the model. Since the higher frequency modes tend to damp out faster and have less effect on the dynamics of the cantilever, only the first N modes is considered in the controller. The state equation for the system is then given as:

$$\begin{cases} \dot{x} = Ax + Bu \\ y = Cx + Du \end{cases} \quad (18)$$

where $$x = [q_1 \; q_2 \; \cdots \; q_N \; \dot{q}_1 \; \dot{q}_2 \; \cdots \; \dot{q}_N]_{1 \times 2N}^T \quad (19)$$

$$A = \begin{bmatrix} 0_{N \times N} & I_{N \times N} \\ -\omega_1^2 & & -2\zeta\omega_1 & \\ & \cdots & & \cdots \\ & & -\omega_N^2 & & -2\zeta_N \omega_N \end{bmatrix}$$

$$B = \begin{bmatrix} 0_{1 \times N} & -\frac{C_a}{I_1} \int_0^{t_1} \frac{\partial^2 \phi_1^I}{\partial x^2} \, dx & \cdots & -\frac{C_a}{I_N} \int_0^{t_1} \frac{\partial^2 \phi_N^I}{\partial x^2} \, dx \end{bmatrix}^T$$

$$C = [\phi_1(L) \; \cdots \; \phi_N(L) \; 0_{1 \times N}]$$

$$D = 0, \; u = V(t)$$

In state feedback, the control input takes the form $$u(t) = -Kx(t) \quad (20)$$

Therefore, choosing K corresponds to choosing the closed loop system poles to give the desired response. To help choose appropriate values of K, several optimal control techniques have been developed. The basic idea behind these techniques is that a cost function is defined and then a controller is formed that minimizes this cost function. In this case, the LQR method is used to optimize the value of K. The cost function is defined as $$J(t) = \int_0^{t_f} (x^T Q x + u^T R u) d\tau \quad (21)$$

Here, $Q=Q^T \geqq 0$ and $R=R^T > 0$ are weighting matrices which can be used to define the importance of individual states and control inputs.

Since the modal coordinates and their derivatives are chosen as states and unmeasurable in this system, a full order state-estimator is constructed and has the form, $$\dot{\hat{x}} = (A - LC)\hat{x} + Ly + Bu \quad (22)$$

By choosing L appropriately, $\hat{x}$ approaches x exponentially since, $$\dot{e} = \dot{x} - \dot{\hat{x}} \quad (23)$$
$$= Ax + Bu - [(A - LC)\hat{x} + Ly + Bu]$$
$$= (A - LC)e$$

The dynamics of the observer are given by the poles of (A−L*C). Since the dynamics of the estimator should be much faster than the system itself, the poles of the observer have to be placed at least three to five times farther to the left than the dominant poles of the system. With the state-estimator, we can obtain an output-feedback controller by using the estimated state $\hat{x}$ instead of the true state x.

$$u(t) = -K\hat{x}(t) \quad (24)$$

Figure 5:
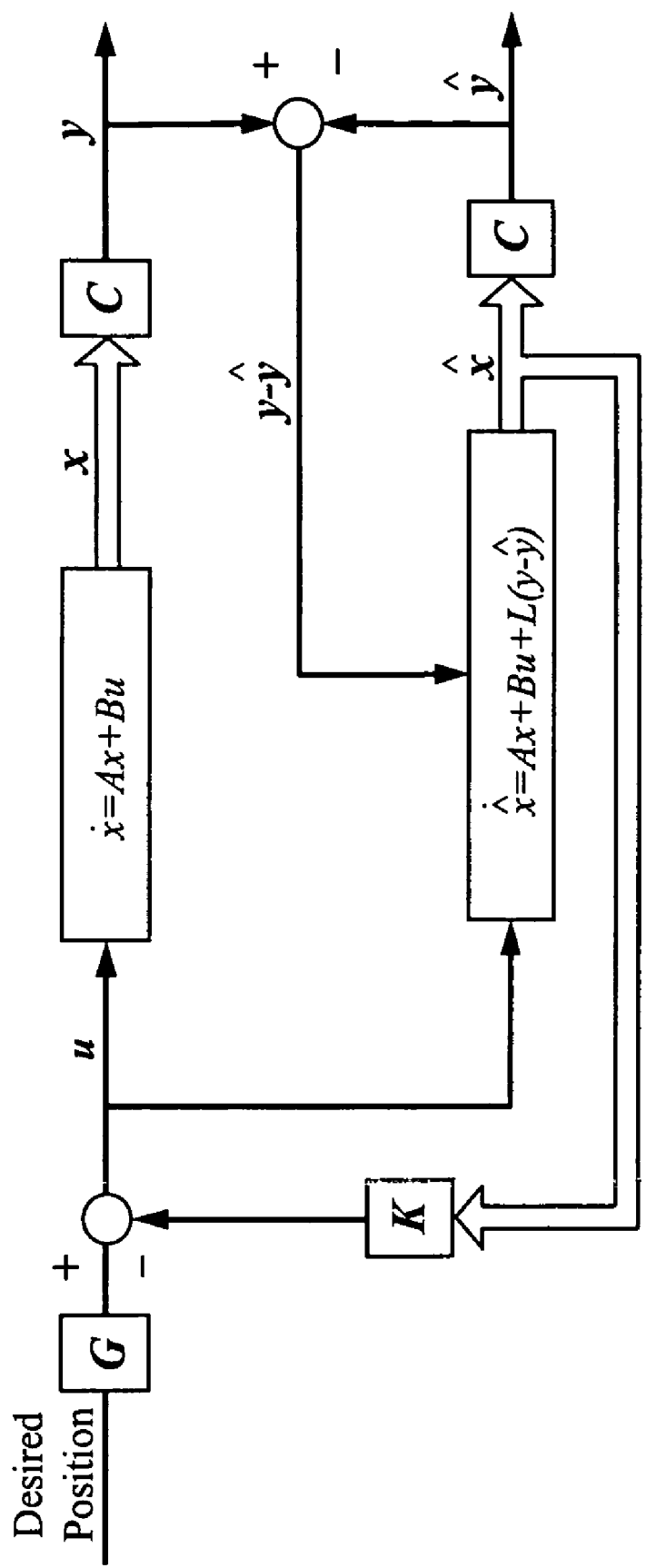
FIG. 5 is a block diagram depicting an exemplary LQR controller in accordance with the present invention.

Using this feedback the closed loop system is now, $$\begin{bmatrix} \dot{x} \\ \dot{\hat{x}} \end{bmatrix} = \begin{bmatrix} A & -BK \\ LC & A - LC - BK \end{bmatrix} \begin{bmatrix} x \\ \hat{x} \end{bmatrix} + \begin{bmatrix} B \\ B \end{bmatrix} u \quad (25)$$

where the structure of the controller is shown in FIG. 5. The term G is a constant gain, and is included to achieve asymptotic tracking of a step input. The existence and stability of the steady-state LQR solution is known in the art. For a LQR problem with R>0, and $Q=C^T C$, where the pair (A,C) is detectable and the pair (A,B) is stabilizable, it follows that a solution to the steady-state LQR problem exists. In particular, there exists a unique positive semidefinite solution P to the algebraic Riccati equation $$P^* A + A^T P^* + Q - P^* B R^{-1} B^T P^* = 0 \quad (26)$$

and if $$K = R^{-1} B^T P \quad (27)$$

then the closed loop system is asymptotically stable.

Experiments were performed using the LQR control scheme in the context of the AFM-based nanomanipulation system 10 described above. In the experiments, a DMASP active probe from Veeco Instruments was used as the end effector. Parameters for the active probe are given in the table below:

| Parameters | Values |
| --- | --- |
| $l_1$ | 374 μm |
| $h_p$ | 3.5 μm |
| $w_p$ | 250 μm |
| $w_2$ | 51 μm |
| $E_p$ | $1.2 \times 10^{11}$ N/m$^2$ |
| $\rho_p$ | $5.2 \times 10^3$ Kg/m$^3$ |
| $d_{31}$ | $3.7 \times 10^{-12}$ m/V |
| L | 500 μm |
| $h_b$ | 4 μm |
| $w_b$ | 250 μm |
| $h_2$ | 4 μm |
| $E_b$ | $1.69 \times 10^{11}$ N/m$^2$ |
| $\rho_b$ | $2.33 \times 10^3$ Kg/m$^3$ |
| k | 1-5 N/m |

The damping coefficients for each mode are identified experimentally. The damping coefficients are adjusted to get the best match in the frequency response of the theoretical model and the experimental data. The damping coefficients for the first two modes are listed in the following table:

| Mode | Theoretical frequency | Damping coefficients |
| --- | --- | --- |
| 1 | 49.2 KHz | 0.005 |
| 2 | 216.3 KHz | 0.007 |

To experimentally verify the accuracy of the cantilever model, an excitation step voltage of −5V is applied to the piezo actuator, and then the vibration of the cantilever tip is measured and analyzed.

Figure 6:
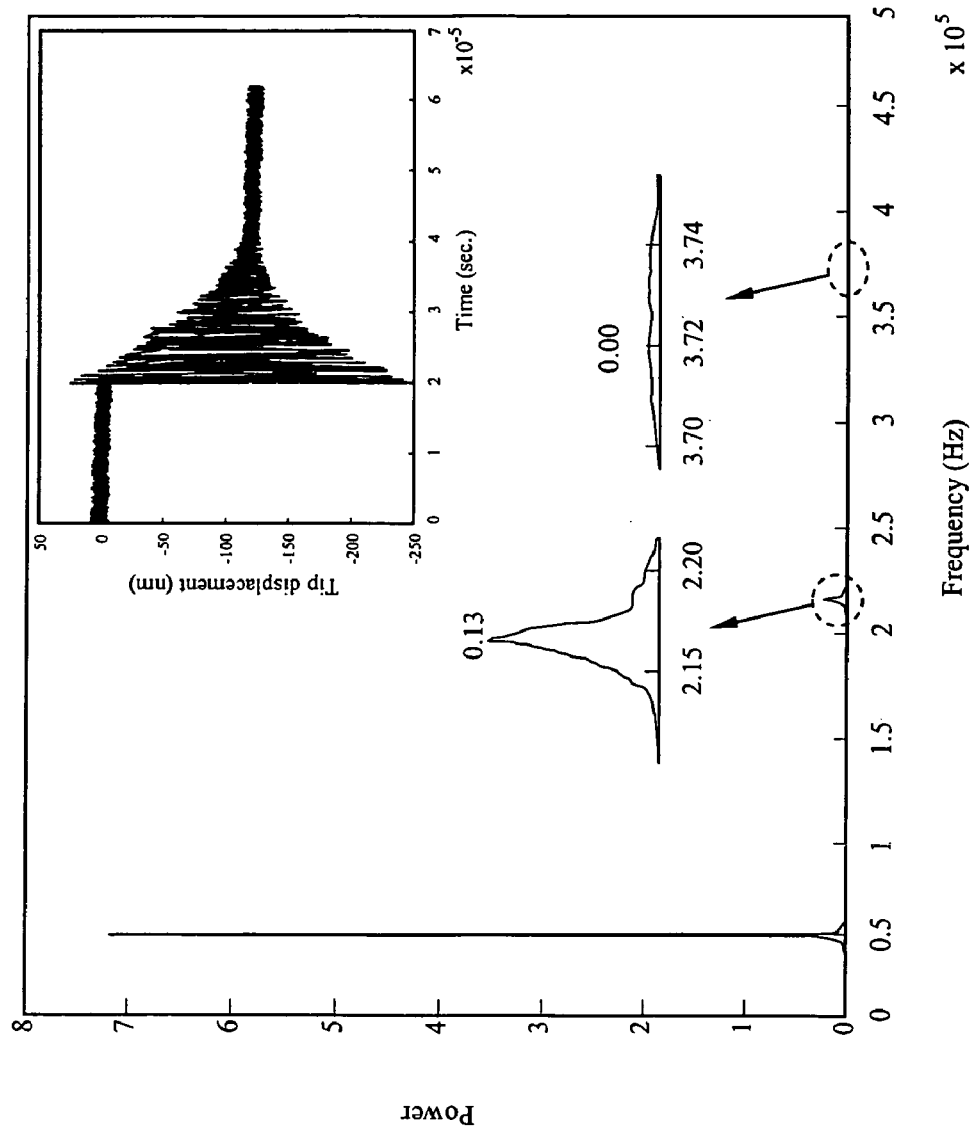
FIG. 6 is a graph illustrating measured tip displacement and vibration of the cantilever during an experiment meant to verify the cantilever model of the present invention.

FIG. 6 shows the measured tip displacement in the experiment. First, the tip is driven to −100 nm and then keeps oscillating around that point until settling down. To identify the frequency components of the vibration, the fast-Fourier transform (FFT) is employed to compute the power spectral density, a measurement of the energy at various frequencies. The frequencies of the vibration can be easily identified from the power spectral density plot as shown in FIG. 6. It can also be observed that the first two modes dominate the response of the cantilever over other higher modes.

The natural frequencies of the cantilever can also be obtained numerically by using the modal analysis method. The experimentally obtained modal frequencies are compared with the theoretically determined modal frequencies in the table below. It can be seen that the theoretical values are in good agreement with the experimental values. This confirms that the theoretical model is accurate enough to predict the modal frequencies and can be used for controller design.

From FIG. 6, it can be seen that only the first two modes dominate the response of cantilever during free vibration. Therefore, only the first two modes are taken into consideration for controller design. Thus, the modes number N equals to 2. The weighting matrices were chosen by the Bryson's rule and a trial-and-error iterative design procedure. The resulting weighting matrices are:

$Q$=diag(100 107 1.5 10), $R$=0.001 (28)

Then, the gain K can be calculated:

$$K=[-0.112\times10^7 \; 2.173\times10^7 \; 38.34 \; 118.51] \quad (29)$$

Since the system (A,C) is observable, an appropriate gain L can be selected by using the pole placement method. By placing the poles of the observer five times farther to left than the dominant poles of the system, L is chosen to be $$L=[1.8\times10^9 \; -1.27\times10^8 \; 7.01\times10^{14} \; 1.56\times10^{15}] \quad (30)$$

Figure 7:
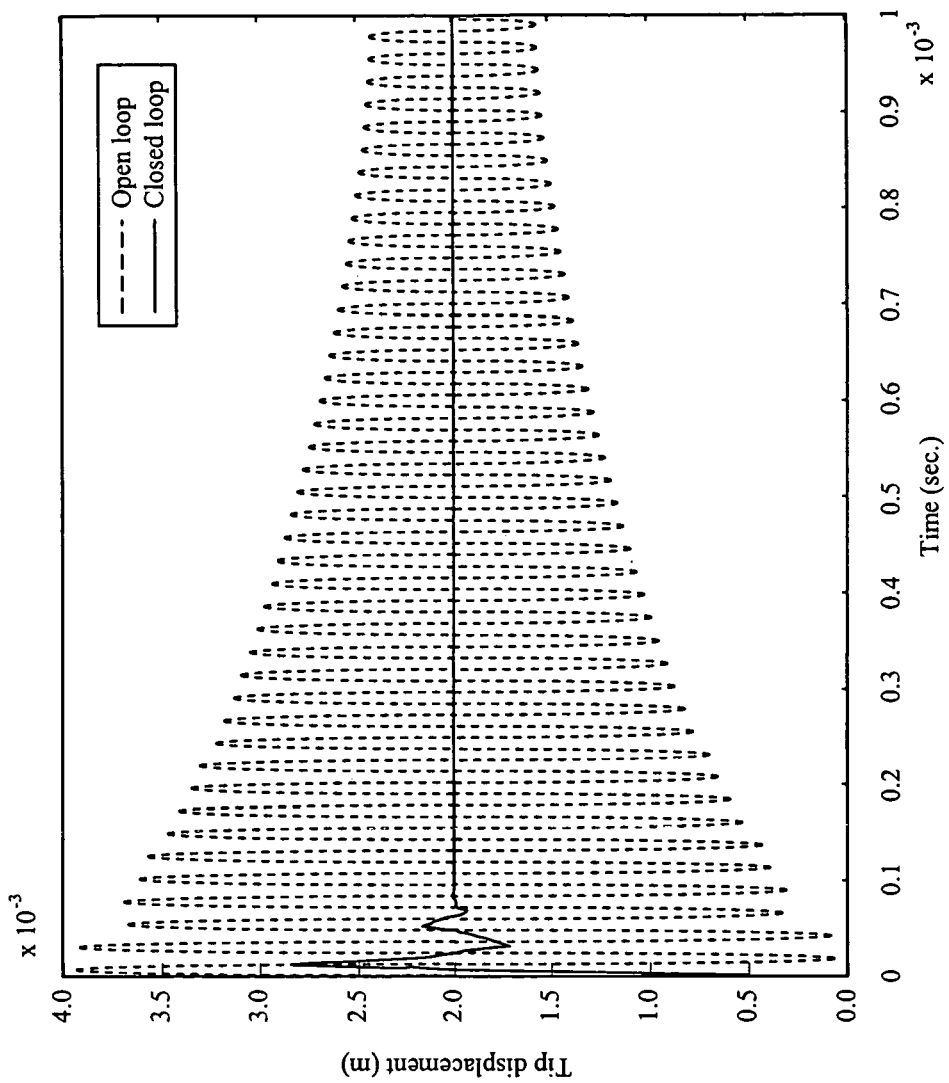
FIGS. 7 and 8 are graphs illustrating the simulated time-response and frequency response, respectively, for an experimental active probe according to the present invention.
Figure 8:
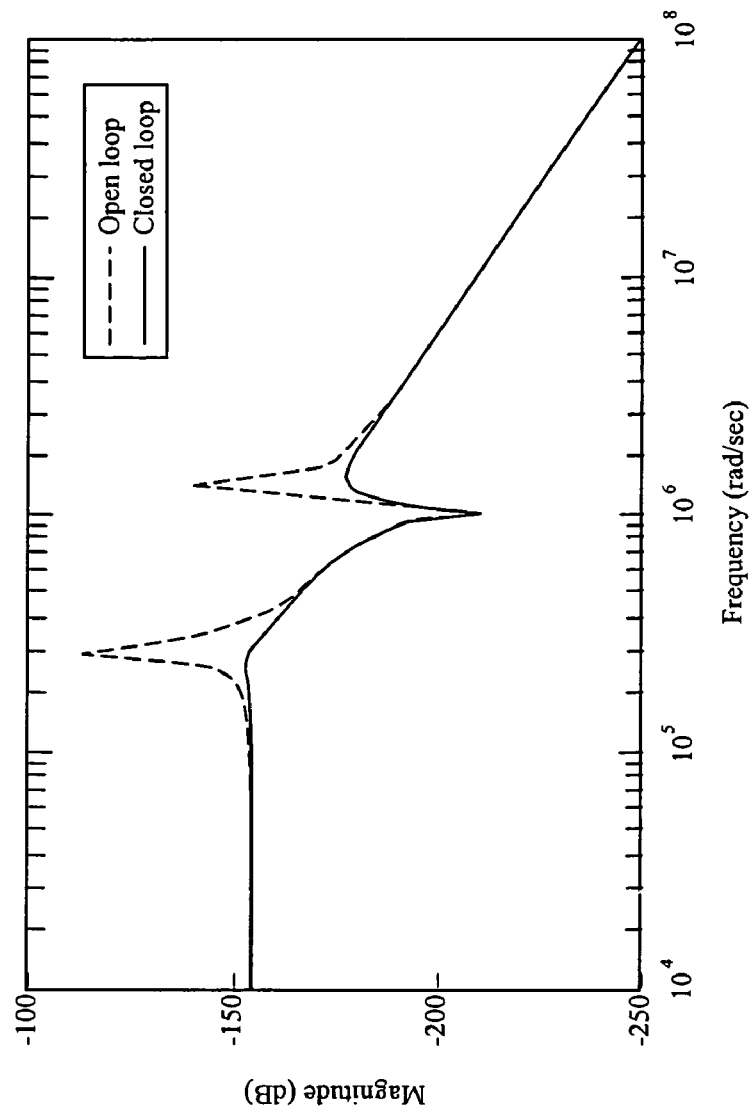

To illustrate the effectiveness of the controller designed above, numerical simulations have been performed using Matlab simulation tools. In order to simulate a real situation of a continuous-time system with a digital controller, the control laws are discretised with 5 μs sampling time, while the equations of motion are integrated using a Runge-Kutta method. The simulated open and closed loop tip responses are shown in FIG. 7. The simulated open and closed loop frequency responses are shown in FIG. 8. From both the plots, it can be seen that significant reduction in the vibrations and increased damping are achieved.

After the effectiveness of the controller was confirmed by simulation, the real-time implementation of this controller was performed using an x86 based PC running Linux operating system. The Real-time Applications Interface patch was used to provide POSIX compliant, real-time functionality to the Linux OS.

Experimental results show the effectiveness of the implemented controller. First, closed-loop trajectory tracking experiments were carried out. FIG. 9 shows the tracking responses of a sine wave and a triangular wave respectively. The results show that the tip can be controlled to follow the desired trajectory very well. The closed-loop trajectory tracking experiments were also performed with the PD controller presented above. FIG. 10 shows the tracking responses with the PD controller. By comparing these two experimental results, it can be seen that the tracking errors of the LQR controller are smaller than those of the PD controller. The LQR controller has a better performance than the simple PD controller. It has to be mentioned that the noise of the measurement is quite big due to the characteristics of the photodiode. From FIG. 6, it can be calculated that the amplitude of the noise is more than seven percent of the signal. Undoubtedly, the noise will affect the control effect.

Figure 11:
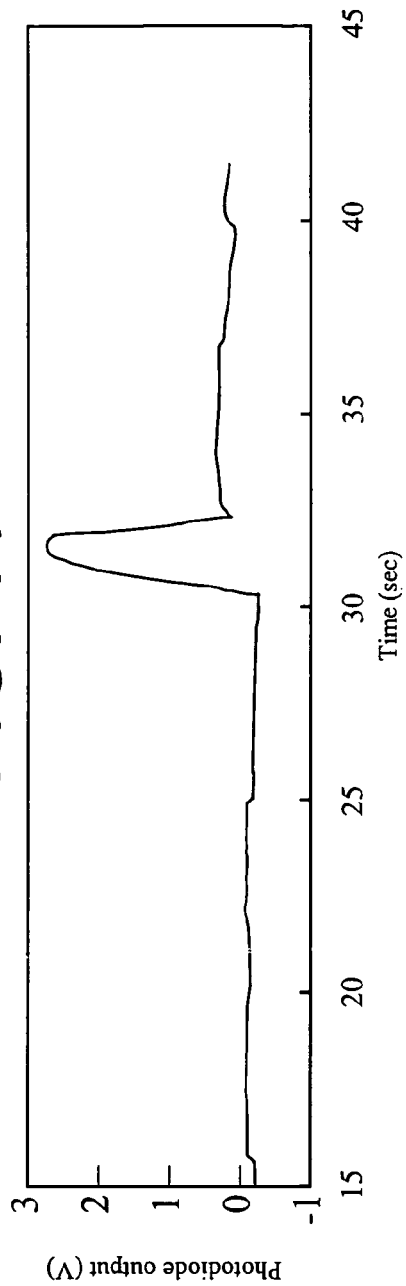
FIG. 11 is a graph illustrating tip displacement of a conventional probe without a preloaded force applied thereto during an exemplary manipulation operation.

Furthermore, some manipulation experiments were performed to prove the necessity of the adaptable end effector controller. A silicon nitride tip with a spring constant of 0.57 N/m was used to push a silver rod with length of 2.5 μm and diameter of 120 nm. The manipulation failed and the rod remained in its original position. FIG. 11 shows the cantilever deflection signal measured with the photodiode sensor. The tip hit the nanowire at t=30 sec and began to push it. The tip displacement reached a maximum value of 120 nm (the voltage output of the photodiode sensor can be converted to the tip displacement with an calibration of 40 nm/V) at t=32 sec and then dropped to zero quickly. This means the tip slipped over the nanowire while pushing.

Figure 12:
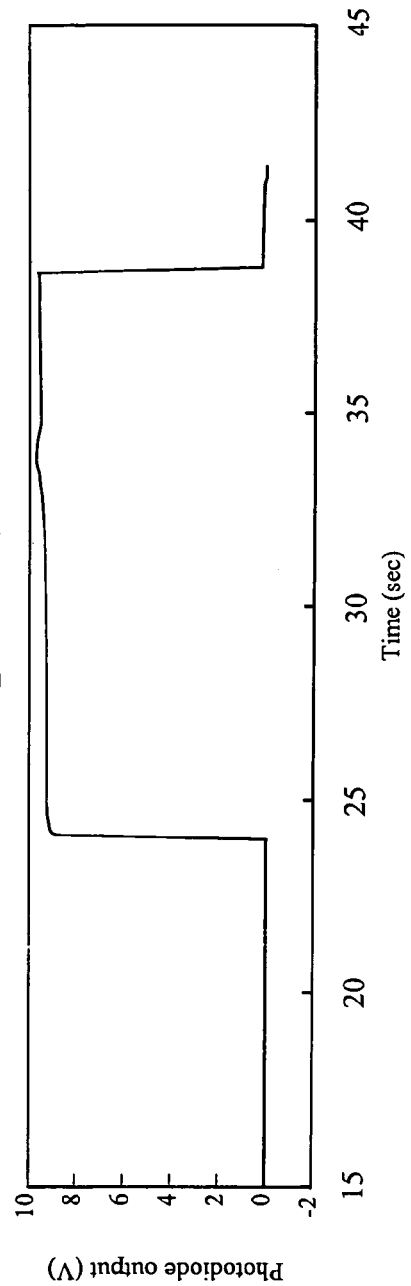
FIG. 12 is a graph illustrating tip displacement of a conventional probe with a preloaded force applied thereto during an exemplary manipulation operation.

To solve this problem in the conventional way, a preloaded force is applied to the tip during manipulation. Then the same tip was used to push the same rod again. It is observed that the rod was pushed away successfully. However, as discussed above, the preloaded force will submerge the interaction force. FIG. 12 shows the deflection signal during manipulation. The AFM tip was preloaded and stuck on the surface at t=24 sec, and then moved toward the rod. At t=33 sec, the tip touched the rod and began to push it. Obviously, the preloaded force almost saturates the photodiode output and the interaction force is unobservable. Hence, it is necessary to develop a new way such that we can improve the efficiency of manipulation and the force sensitivity simultaneously.

Figure 13A:
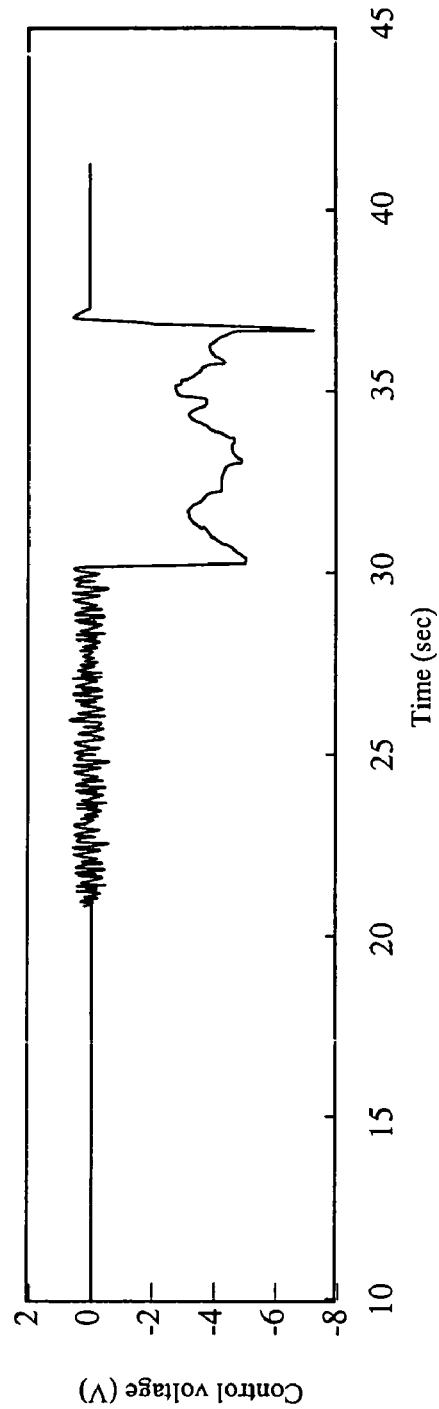
FIGS. 13A and 13B are graphs illustrating control voltage and tip displacement, respectively, of an active probe being controlled in accordance with the present invention during an exemplary manipulation operation.
Figure 13B:
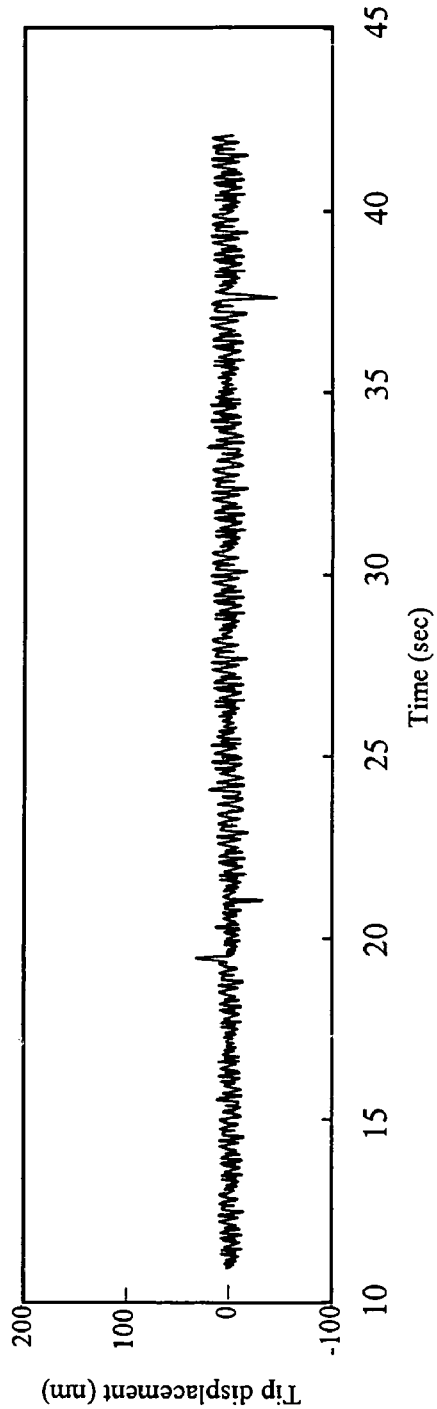

Finally, manipulation experiments using an active probe in accordance with the present invention were performed to verify the effectiveness of the controller and the efficiency of the system. FIG. 13(A) shows the control signal and FIG. 13(B) shows the tip displacement in vertical direction. The AFM tip was driven to float on the top of the sample surface at t=19 sec. Then the controller started at t=21 sec. The AFM tip also began to move toward the rod and hit the rod at t=30 sec. At t=37 sec, the silver rod was pushed to the desired position. Finally, the tip was lifted up and the controller was turned off. FIG. 13(A) shows that there is substantial increase of control signal after the tip touched the rod. Thus, the interaction force can be easily reconstructed from the control signal. The force feeling from the haptic device is much better than that using traditional cantilever. In addition, it can be seen from FIG. 13(B) that the deflection signal is almost flat which means that the cantilever was controlled to keep straight during manipulation. Therefore, the tip position is able to be controlled more accurately using an adaptable end effector than using a traditional cantilever.

Since the adaptable end effector control will keep the cantilever straight during manipulation, there won't be interaction force between tip and substrate surface when there is no preload. Thus the interaction forces among tip, object and substrate are greatly simplified. FIG. 14 shows the model of tip-object interaction where θ is the twisting angle of cantilever and γ is the half angle of the tip apex. θ can be measured from the lateral signal from photo diode. With θ and γ known, the normal force $F_n$ and lateral force $F_l$ applied on the tip can be easily decoupled from the interaction force F between tip and object. Because the goal of controller is to keep the cantilever straight, the control signal V, which is applied on piezoelectric film to activate the cantilever to balance the transverse deflection, can represent the normal force $F_n$.

$$F_n = c \cdot V$$

Where c is a constant. From FIG. 14A, the lateral force can be written as:

$$F_l = F_n / \tan(\theta + \gamma)$$

Figure 14B:
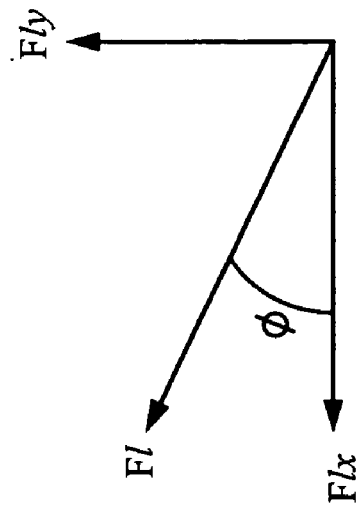
FIGS. 14A and 14B are diagrams depicting the model for interaction forces between an active probe of the present invention and an object being manipulated.
Figure 14A:
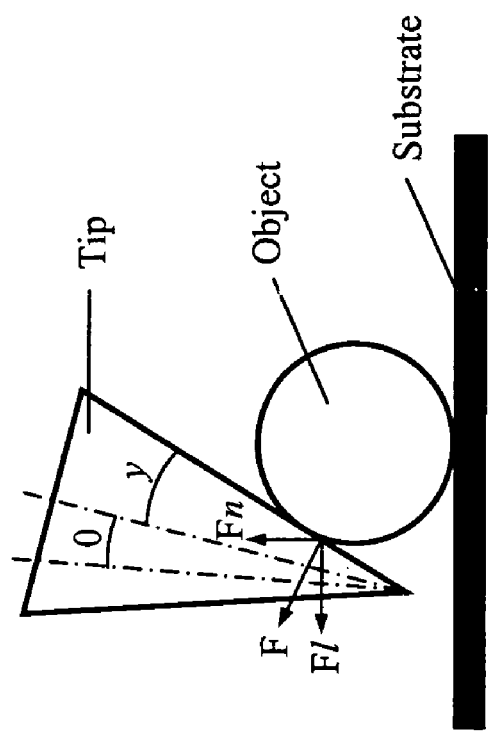

In FIG. 14B, φ is the angle between the direction of lateral force and x direction and is determined by the direction of movement. Thus the lateral force $F_l$ can be decomposed into lateral force in the x direction and the y direction as:

$$F_{lx} = F_l \cos \phi$$

$$F_{ly} = F_l \sin \phi$$

With each of these force equations, control signal V can be used to calculate the interaction force in three dimensions during manipulation. Finally, the 3-D force information can be displayed by the haptic joystick through a scaling factor.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A nanomanipulation system for performing nanomanipulation operations in relation to a sample surface, comprising:
    an atomic force microscope having a probe for performing nanomanipulation operations on the sample surface, where the probe includes a cantilever having a layer of piezoelectric material;

a position detector configured to ascertain deformation of the cantilever during a nanomanipulation operation;

an active probe controller adapted to receive data indicative of the deformation from the position detector and implements a control scheme based on the deformation data which maintains rigidity of the cantilever during the nanomanipulation operation, wherein the control scheme produces a control signal that is applied to the piezoelectric material of the cantilever.

2. The nanomanipulation system of claim 1 wherein the probe further include a tip extending outwardly from the cantilever for manipulating objects on the sample surface, such that the deformation of the cantilever is caused by an interaction force applied to the tip during the nanomanipulation operation.

3. The nanomanipulation system of claim 2 wherein the cantilever is a substantially rectangular plate made of a silicon material and having a protruding finger, wherein the piezoelectric material is applied to at least one side of the rectangular plate.

4. The nanomanipulation system of claim 3 wherein the tip is disposed at a distal end of the protruding finger and extends outwardly in a direction substantially perpendicular to a longitudinal surface of the rectangular plate.

5. The nanomanipulation system of claim 2 further comprises a microscope controller adapted to receive the control signal from the probe controller and operable to determining force data for interaction forces that are being applied to the tip during the nanomanipulation operation, where the force data is derived from the control signal along at least two perpendicularly arranged axis.

6. The nanomanipulation system of claim 5 further comprises a data store for storing an image model representing the topography of the sample surface, where the microscope controller is operable to update the image model based on said force data.

7. The nanomanipulation system of claim 6 further comprises a display in data communication with the microscope controller and operator to display the image model to an operator of the atomic force microscope during the nanomanipulation operation.

8. The nanomanipulation system of claim 1 wherein the control signal is further defined as a voltage applied to the piezoelectric material which causes a deformation of the cantilever structure that counteracts the deformation caused by the interaction force and detected by the position detector.

9. The nanomanipulation system of claim 1 wherein the control scheme employs a proportional derivative control technique.

10. The nanomanipulation system of claim 1 wherein the control scheme is further defined as $$V(t) = K_v(\dot{y}^d - \dot{y}) + K_p(y^d - y)$$

where y is the transverse deflection of the cantilever, $y^d$ is the desired trajectory of the cantilever, $K_v$ is the derivative gain and $K_p$ is the proportional gain.

11. The nanomanipulation system of claim 1 wherein the control scheme employs a linear quadratic regulator control technique for controlling multiple vibration modes of the cantilever, where each vibration mode is estimated from the measured deformation of the cantilever.

12. The nanomanipulation system of claim 11 wherein the vibration modes are estimated in accordance with $$\dot{\hat{x}} = (A - LC)\hat{x} + Ly + Bu$$

where u is the voltage signal applied to the piezoelectric material, $\hat{x}$ is the estimated state for the vibration modes, and y is the transverse deflection of the cantilever.

13. A control scheme for a probe of an atomic force microscope in a nanomanipulation system, where the probe includes a cantilever structure having a piezoelectric material applied thereto, comprising:

detecting transverse deflection at an end of the cantilever structure during a nanomanipulation operation, where the deflection is caused by an interaction force between a tip of the probe and a manipulated object;

defining a desired deflection of the cantilever to be zero; and generating a control signal based on the desired deflection, where the control signal is applied to the piezoelectric material of the cantilever.

14. The control scheme of claim 13 further comprises determining force data for interaction forces that are being applied to the tip during the nanomanipulation operation, where the force data is derived from the control signal along at least two perpendicularly arranged axis.

15. The control scheme of claim 14 further comprises updating an image model based on the force data, where the image model represents the topography of a sample surface.

16. The control scheme of claim 13 wherein generating a control signal is based on a proportional derivative control technique defined as $$V(t) = K_v(\dot{y}^d - \dot{y}) + K_p(y^d - y)$$

where y is the transverse deflection of the cantilever, $y^d$ is the desired trajectory of the cantilever, $K_v$ is the derivative gain and $K_p$ is the proportional gain.

17. The control scheme of claim 13 wherein generating a control signal is based on a linear quadratic regulator control technique that a linear quadratic regulator control technique for controlling multiple vibration modes of the cantilever, where each vibration mode is estimated from the measured deformation of the cantilever.

18. A nanomanipulation system for performing nanomanipulation operations in relation to a sample surface, comprising:

an atomic force microscope having a probe for performing nanomanipulation operations on the sample surface, where the probe includes a cantilever having a layer of piezoelectric material;

a position detector configured to detect bending of the cantilever during a nanomanipulation operation;

an active probe controller adapted to receive data indicative of the bending from the position detector and implements a control scheme based on maintaining a desired deflection of the cantilever at zero during the nanomanipulation operation.

19. The nanomanipulation system of claim 18 wherein the probe further include a tip extending outwardly from the cantilever for manipulating objects on the sample surface, such that the bending of the cantilever is caused by an interaction force applied to the tip during the nanomanipulation operation.

20. The nanomanipulation system of claim 19, wherein the cantilever is a substantially rectangular plate made of a silicon material and having a protruding finger, wherein the piezoelectric material is applied to at least one side of the rectangular plate.

21. The nanomanipulation system of claim 20 wherein the tip is disposed at a distal end of the protruding finger and extends outwardly in a direction substantially perpendicular to a longitudinal surface of the rectangular plate.

22. The nanomanipulation system of claim 19 further comprises a microscope controller adapted to receive the control signal from the probe controller and operable to determining force data for interaction forces that are being applied to the tip during the nanomanipulation operation, where the force data is derived from the control signal along at least two perpendicularly arranged axis.

23. The nanomanipulation system of claim 18 wherein the control scheme produces a control signal that is applied to the piezoelectric material which causes a deformation of the cantilever structure that counteracts the bending detected by the position detector.

24. The nanomanipulation system of claim 18 wherein the control scheme employs a proportional derivative control technique further defined as $$V(t)=K_v(\dot{y}^d-\dot{y})+K_p(y^d-y)$$

where y is the transverse deflection of the cantilever, $y^d$ is the desired trajectory of the cantilever, $K_v$ is the derivative gain and $K_p$ is the proportional gain.

25. The nanomanipulation system of claim 18 wherein the control scheme employs a linear quadratic regulator control technique for controlling multiple vibration modes of the cantilever, where each vibration mode is estimated from the measured deformation of the cantilever.

26. The nanomanipulation system of claim 22 further comprises a data store for storing an image model representing the topography of the sample surface, where the microscope controller is operable to update the image model based on said force data.

27. The nanomanipulation system of claim 26 further comprises a display in data communication with the microscope controller and operable to display the image model to an operator of the atomic force microscope during the nanomanipulation operation.

* * * * *

UNITED STATES PATENT AND TRADEMARK OFFICE
CERTIFICATE OF CORRECTION

PATENT NO. : 7,406,859 B2
APPLICATION NO. : 11/399690
DATED : August 5, 2008
INVENTOR(S) : Ning Xi, Guangyong Li and Jiangbo Zhang It is certified that error appears in the above-identified patent and that said Letters Patent is hereby corrected as shown below:

Column 2, line 56, after "displacement", insert --of--.

Column 2, line 59, after "displacement", insert --of--.

Column 11, line 54, "an" should be --a--.

Column 14, line 34, Claim 17, delete "that a linear quadratic regulator control technique".

Signed and Sealed this

Seventeenth Day of February, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,406,859 B2  
APPLICATION NO. : 11/399690  
DATED : August 5, 2008  
INVENTOR(S) : Ning Xi et al.

Page 1 of 1

It is certified that error appears in the above-identified patent and that said Letters Patent is hereby corrected as shown below:

In the Specification

Column 1, Line 12, before "FIELD OF THE INVENTION" insert -- GOVERNMENT SUPPORT CLAUSE
This invention was made with government support under IIS9796287 awarded by the National Science Foundation. The government has certain rights in the invention. --

Signed and Sealed this
Twenty-fifth Day of February, 2014

Michelle K. Lee
*Deputy Director of the United States Patent and Trademark Office*